United States Patent
Van Leemput

(10) Patent No.: US 10,621,726 B2
(45) Date of Patent: Apr. 14, 2020

(54) SEGMENTATION OF OBJECTS IN IMAGE DATA USING CHANNEL DETECTION

(71) Applicant: NOBEL BIOCARE SERVICES AG, Kloten (CH)

(72) Inventor: Pieter Van Leemput, Rumst (BE)

(73) Assignee: Nobel Biocare Services AG, Kloten (CH)

( * ) Notice: Subject to any disclaimer, the term of this patent is extended or adjusted under 35 U.S.C. 154(b) by 10 days.

(21) Appl. No.: 15/559,364

(22) PCT Filed: Mar. 17, 2016

(86) PCT No.: PCT/EP2016/055756
§ 371 (c)(1),
(2) Date: Sep. 18, 2017

(87) PCT Pub. No.: WO2016/146722
PCT Pub. Date: Sep. 22, 2016

(65) Prior Publication Data
US 2018/0075606 A1 Mar. 15, 2018

(30) Foreign Application Priority Data
Mar. 19, 2015 (EP) ..................................... 15159963

(51) Int. Cl.
*G06T 7/11* (2017.01)
*G06T 7/12* (2017.01)
*G06T 7/73* (2017.01)

(52) U.S. Cl.
CPC .................. *G06T 7/11* (2017.01); *G06T 7/12* (2017.01); *G06T 7/73* (2017.01);
(Continued)

(58) Field of Classification Search
CPC ..... G06T 7/11; G06T 7/73; G06T 7/12; G06T 2207/10116; G06T 2207/30012;
(Continued)

(56) References Cited

U.S. PATENT DOCUMENTS 5,233,670 A * 8/1993 Dufour ................ G06K 9/4638
382/197
5,595,703 A 1/1997 Swaelens et al.
(Continued)

FOREIGN PATENT DOCUMENTS

EP 1382297 A1 1/2004
EP 2 476 363 A1 7/2012
(Continued)

OTHER PUBLICATIONS

Wang, Lei et al., "Fully Automated Segmentation of the Pectoralis Muscle Boundary in Breast MR Images", Proc. SPIE, vol. 7963, Mar. 2011, pp. 1-8.*
(Continued)

*Primary Examiner* — Jerome Grant, II
(74) *Attorney, Agent, or Firm* — Knobbe Martens Olson & Bear LLP

(57) ABSTRACT

The present application relates to a computer implemented method of identifying a channel between at least two objects from image data comprising a plurality of pixels or voxels. The method comprises a cycle comprising the steps of choosing a portion of the image data which contains image data of at least a part of at least two of the objects, calculating image gradients of the pixels or voxels of the portion of the image data, and analyzing an orientation of the image gradients. If at least two of the image gradients point into opposing directions, the chosen portion of the image data is determined to contain edges of the objects defining the channel. This method can subsequently be used to
(Continued)

separate or segment the objects or parts of the objects defining the channel.

16 Claims, 4 Drawing Sheets

(52) U.S. Cl.
CPC ............... *G06T 2207/10072* (2013.01); *G06T 2207/10116* (2013.01); *G06T 2207/10132* (2013.01); *G06T 2207/20016* (2013.01); *G06T 2207/30012* (2013.01)

(58) Field of Classification Search
CPC . G06T 2207/10132; G06T 2207/10072; G06T 2207/20016
USPC ......................................................... 382/130
See application file for complete search history.

(56) References Cited

U.S. PATENT DOCUMENTS

| | | | |
|---|---|---|---|
| 8,425,229 | B2 | 4/2013 | Nilsson et al. |
| 8,594,820 | B2 | 11/2013 | Manai et al. |
| 8,805,658 | B2 | 8/2014 | Pettersson et al. |
| 9,218,534 | B1* | 12/2015 | Smith ................. G06K 9/00798 |
| 2010/0151417 | A1 | 6/2010 | Nilsson et al. |
| 2011/0060558 | A1 | 3/2011 | Pettersson et al. |
| 2011/0196524 | A1 | 8/2011 | Giasson et al. |
| 2011/0235910 | A1* | 9/2011 | Soceanu ............ G06K 9/00295 |
| | | | 382/173 |
| 2012/0123576 | A1 | 5/2012 | Pettersson et al. |
| 2013/0322745 | A1* | 12/2013 | Lim ........................ H04N 9/73 |
| | | | 382/162 |
| 2014/0064580 | A1* | 3/2014 | Madabhushi ......... G06T 7/0012 |
| | | | 382/128 |
| 2015/0078648 | A1* | 3/2015 | Lee ...................... G06K 9/0014 |
| | | | 382/133 |

FOREIGN PATENT DOCUMENTS

| | | | | |
|---|---|---|---|---|
| EP | 2476363 | * | 7/2012 | ............... G06T 7/60 |
| EP | 2476363 | A1 * | 7/2012 | ............... A61B 1/00 |
| EP | 2648160 | A1 | 10/2013 | |
| WO | WO 2009/111580 | A2 | 9/2009 | |
| WO | WO 2016/146722 | A1 | 9/2016 | |
| WO | WO 2017/220619 | A1 | 12/2017 | |

OTHER PUBLICATIONS

Lemaitre, Cédric et al., "Detection and matching of curvilinear structures", Pattern recognition 44.7 (2011), pp. 1514-1527.
Wang, Lei et al., "Fully automated segmentation of the pectoralis muscle boundary in breast MR images", Proc. SPIE, vol. 7963, 2011, pp. 1-8.
European Search Report for Application No. EP 15 15 9963, dated Aug. 28, 2015, 2 pages.
International Search Report for International Application No. PCT/EP2016/055756, dated May 30, 2016, 3 pages.
Office Action received in Japanese Application No. 2017-543982 dated Feb. 4, 2020 in 9 pages including translation document.

* cited by examiner

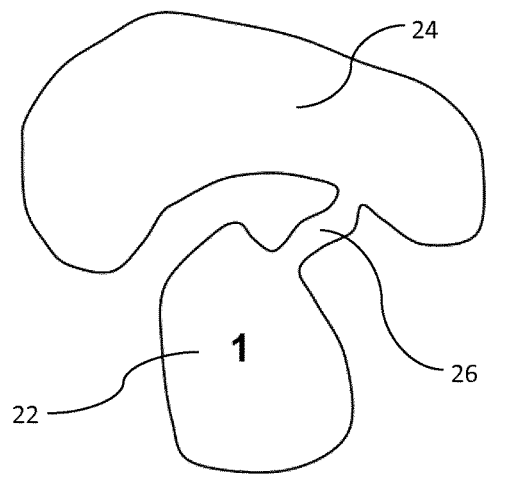
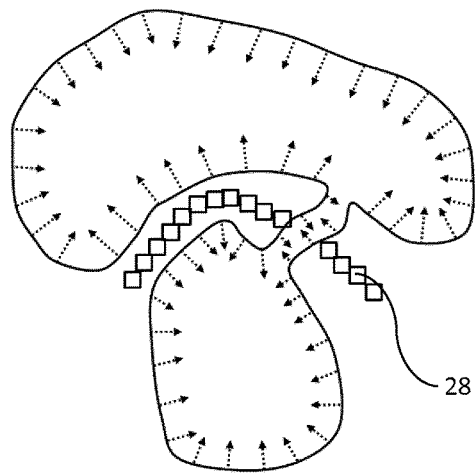
Fig. 2A  Fig. 2B
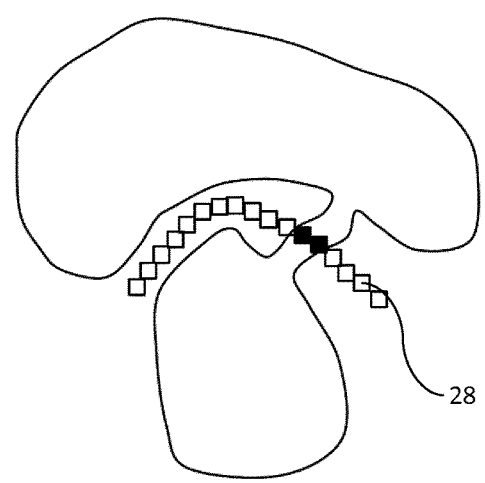
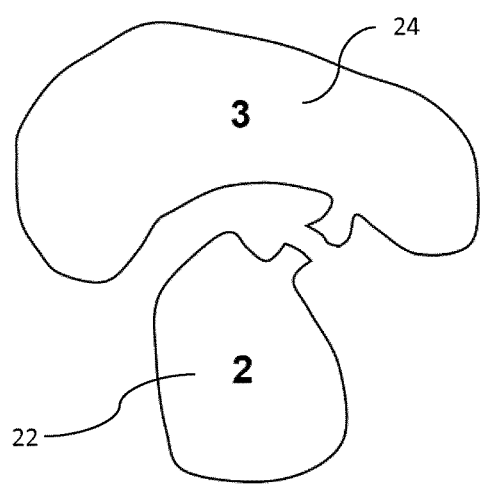
Fig. 2C  Fig. 2D

SEGMENTATION OF OBJECTS IN IMAGE DATA USING CHANNEL DETECTION

CROSS-REFERENCE TO RELATED APPLICATIONS

This is a U.S. national phase application under 35 U.S.C. § 371 of International Application No. PCT/EP2016/055756, entitled SEGMENTATION OF OBJECTS IN IMAGE DATA USING CHANNEL DETECTION, filed on Mar. 17, 2016, and published on Sep. 22, 2016 as WO 2016/146722, which claims the benefit of EP Application No. 15159963.6 filed on Mar. 19, 2015, and which are hereby incorporated by reference in their entirety.

TECHNICAL FIELD

The present invention relates generally to a method of identifying a channel between at least two objects from image data and using it to segment (i.e. separate) both objects. In particular, this method was developed in the context of medical imaging for objects of tissue such as bone. Further, the invention relates to a computer program product realizing such method, a readable medium carrying such computer program product and an apparatus set up to execute such computer program product.

BACKGROUND

The following text deals with image analysis methods, in particular with methods for segmentation of (parts of) objects in an image, for example a computer tomographic image of a joint within the human or animal body (like hip joints, shoulder joints, vertebral joints, knee joints, wrist joints, etc.) wherein the objects connected via the joint can be segmented. For image processing, a segmentation (i.e. a separation) of different parts of different, or same, objects may be necessary. The parts may have different properties in the image, i.e. variations in features such as gray scale/brightness, color and similar. These differences result from distinct properties of the imaged objects. Depending on the imaging process, properties such as density, material composition, water content, content of a tracer, absorbency/reflection rate for ultrasonic waves or light and similar can be distinguished. The task of segmentation of the representations of parts of the real objects, which involves segregating regions with the same or similar properties in the image and building coherent groups, can be automatically accomplished by means of algorithms. Especially in medical imaging, it is desirable to automatically accomplish the segmentation of different forms of tissue, such as fat, muscle and bone, and the recognition of coherent regions (e.g. bones or organs) in the course of the imaging process or image processing. With particular regard to maxillofacial surgery and dental treatments, an algorithm to automatically separate the condyle head from the skull base (more specifically, the fossa) at the temporomandibular joint would be very useful.

In medical image processing, correlation techniques are used to facilitate an automatic identification of regions in an image representing certain parts or structures such as organs, bones, joints or, respectively, parts thereof. Those regions are called Regions of Interest (ROI). A correlation technique uses templates of structures that are matched with the image data in order to localize the ROI. For that purpose, similarity measures are computed with a cross-correlation or a normalized cross-correlation representing the grade of correlation (or similarity) between the template and different regions in the image data. The region with the best similarity measure is selected for the further image processing steps. Such correlation techniques are generally known in the art.

In order to assess the information contained in an image, the different parts and/or objects shown in the image have to be unambiguously distinguishable. In images derived from image data, some parts of objects or objects as such may appear to be integrally connected, although there is no such connection in reality. This kind of erroneous fusion can arise during data capturing, the reconstruction of the image and/or image processing steps. The segmentation of such fused elements is hard to automate in current image processing systems and, therefore, frequently requires delineation by hand from the user. Manual segmentation of objects or parts thereof can be very difficult when the latters are small and the gaps in between are narrow. Also, in three dimensions, the user's view is typically obstructed by other objects or parts. Thus, a user might choose wrong lines and surfaces. In addition, segmentation by hand is labor-intensive and can be very time consuming, thus leading to high costs.

The mandible (i.e. the lower jaw) is a bony structure that is connected to the skull base by two temporomandibular joints (TMJ), residing on top of the left and right condyle. These joints allow the mandible to move, e.g. for chewing. Due to their low density in computed tomography (CT) images, they define a 3D channel in between the denser bone of condyle and fossa.

A maxillofacial surgeon using surgical planning software should be able to virtually reposition the mandible of a patient in order to obtain a better occlusion or to mimic realistic jaw articulation. To this end, separate virtual surface objects are needed: one representing the mandible and the other representing the rest of the skull. Specifically, the surface representation of the condyle at the apex of the mandible must be fully separated from the skull base.

Presently, this is usually not the case because the gray values in the TMJ region can be quite fuzzy due to a variety of reasons. When some TMJ voxels have a gray value larger than the isovalue threshold, which is chosen by the user to mark the visible surface in an image resulting from DICOM image data, the surfaces get connected. Limited scanner accuracy, noise, patient movement and/or the partial volume effect (PVE) are the most common causes. PVE occurs when the CT scanner beam is non-linearly attenuated by two different types of tissue that occur together in a voxel. Streak artifacts can cause a virtual channel obstruction by introducing spurious large gray values inside the channel.

Non-standard patient anatomy or TMJ defects, like partial ankylosis or joint resorption, can even result in physical contact between the joint and fossa. As such, the low-density channel defined by the TMJ is partially blocked and the virtual surface models will be connected. It is understood that this prevents the surgeon from virtually repositioning the mandible.

SUMMARY OF THE INVENTION

For maxillofacial surgery and dental treatments, a delineation or indication of the joint channel is detected. The channel is subsequently used to split the integrally connected mandibular and skull base surfaces from each other. This allows the surgeon to virtually move the elements connected to each other via the temporomandibular joint. As mentioned above, manually separating or delineating the condyle surface is a tedious, labor-intensive, repetitive and time consuming process. It is also difficult to visualize the cutting/delineation region because of a) the physical properties of a 3D joint and b) the channel between condyle and fossa being narrow.

The present invention solves the above problems through a method according to claim 1, a non-transitory computer program product configured to execute the method, a non-transitory computer readable medium carrying the computer program product, an apparatus adapted to execute the computer program product and a medical system configured to carry out the method, and where the medical system includes a computer adapted to execute a non-transitory computer program product configured to perform the method and an imaging device for obtaining image data of at least two surface objects of bone. Advantageous and preferred features and further developments of the present invention are subject of the dependent claims.

According to the invention, a computer implemented method of identifying, from image data comprising a plurality of pixels or voxels, a channel between at least two objects, for example of tissue, in particular bone, of the human or animal body, comprises a cycle, preferably several cycles, of the following steps.

Image gradients of the pixels or voxels of the image data are calculated and their orientations are analyzed. For each pixel or voxel, if at least two of the neighboring image gradients point into opposite directions, the pixel or voxel in between the gradients is determined to be part of the channel. Here, the channel is defined by the edges of the objects surrounding it. The channel can be located in the background of said image.

In one embodiment of the invention a computer implemented method of identifying, from image data comprising a plurality of pixels or voxels, a "channel", e.g an image region, between at least two objects, or between parts of an object, comprises a cycle, preferably several cycles, comprising the steps of:

In one embodiment of the invention a computer implemented method referring to method 40 of FIG. 4 of identifying, from image data comprising a plurality of pixels or voxels, a "channel", e.g an image region, between at least two objects, or between parts of an object, comprises a cycle 42-56, preferably several cycles 58, comprising the steps of:

calculating 42 image gradients of the pixels or voxels of the image data, and analyzing 44 the orientation of the image gradients, wherein, if at least two 50 of the image gradients point into opposing directions away from each other 46, the pixels or voxels in between the opposing image gradients locate 48 the channel, the method further comprising:

identifying 52 the pixels or voxels creating holes in the channel volume, said pixels or voxels making said objects or said parts of an object on each side of the channel to be connected, closing 54 the channel volume, using the closed channel volume to cut 56 through the connections thereby disconnecting said objects, or said parts of an object, on either side of the channel and obtaining separate objects or separate parts of an object.

Preferably, a portion of the image data is chosen. The portion contains image data of at least a part of at least two of the objects (ROI). Preferably, image gradients of the pixels or voxels of the chosen portion of the image data are calculated and their orientations are analyzed. In this case, for each pixel or voxel, if at least two of the neighboring image gradients point into opposite directions, the chosen portion of the image data is determined to contain edges of the objects defining the channel.

Preferably the channel is subsequently used to segment the objects on either side of the channel, e.g. by further comprising generating surfaces of the corresponding objects that are separated by the channel.

The inventors have found that, when gradient vectors in the image are opposing, they indicate the existence of edges between (parts of) objects which can be used to identify the channel in between the objects. Conventionally, the objects were identified rather than the channel. According to the invention, it is the channel which is identified and the segregation/segmentation of the objects is carried out on the basis of this channel.

The inventive method allows for using a computer for the segmentation of closely located parts, in particular parts of a temporomandibular joint, in a medical image on the basis of the image data obtained from, e.g. computed tomography or a similar source. In particular, with regard to maxillofacial surgery, "segregation", "segmentation" or "splitting" the bone surfaces connected by the joint can be automated on the basis of the present invention.

Thereby, on the one hand, the tedious task and the risk of an imprecise or incorrect segmentation by a human in medical treatment are avoided. On the other hand, the image analysis is completed in less time and, therefore, the costs for the image analysis can be reduced.

An "object" in this context is to be understood as an object in the image bounded by a surface (or equivalently by edges). This surface may oppose a surface of a different object in the image, or may face a non-surface object such as non-bone tissue. Further, a "channel" in this context is to be understood as a small region between two objects which may be "empty" or occupied by some other material, like fat, water, air, etc (in other words the channel can be located in the background of the image whereas the objects are in the foreground). Hence, the expression "identification of a channel between at least two surface objects" is used synonymously to segmentation of, segregation of or distinguishing of at least two parts of one or more objects. A particular example of an object is the condyle surface, e.g. when the channel is to be determined between the mandibular and skull base surfaces.

"Image data" are data, usually digital data, that contain information that may, or is intended to, be interpreted, e.g. by a computer software, to form a two- or three-dimensional image. Such image data can, for example, be obtained from a computed tomography (CT), ultrasonic imaging (US) or magnetic resonance imaging (MRI) system, but also from simple X-ray or similar methods and are not restricted to a specific imaging method. Preferably, however, the image data are obtained from CT or cone beam computed tomography (CBCT).

"Image gradients" are intensity differences between properties of pixels or, preferably, voxels of an image and can be calculated for the whole image at once. Preferably, these properties are gray scale, brightness values and/or color values that represent real physical properties such as density, water content, shape, surface roughness etc. of an object. A non-zero value of the gradient in a pixel/voxel indicates a change in intensity between the pixel/voxel and its neighbors. A large value (i.e. a large gradient vector size) typically occurs at the object's surface (i.e. at the edges). The orientation of an image gradient vector is the direction in which the intensity of the respective property of a pixel or voxel increases most. In the context of the present invention, two gradients are understood to be facing in opposite directions, when the gradient vectors of the pixels/voxels point away from the respective other voxel rather than towards the other pixel/voxel.

Preferably, the objects are objects of tissue, in particular objects of bone, of the human or animal body. However, the present invention can generally also be applied to other objects.

According to a preferred method, a portion of the image data is chosen such that it contains image data of at least a part of the at least two objects. However, it is not essential to choose a portion of the image data but it is also possible to apply the method to the complete image data provided for the method. Choosing a portion of the image data improves the method in that further automation of identifying the channel between the at least two objects is possible.

Along its longitudinal extension, the width of the channel between the surface objects can vary. Additionally, channels of generally different widths can be of interest. Therefore, it is advantageous to automatically adapt the step size for calculating the channel, using a so-called multiresolution approach. Adaptation can be towards longer steps for wider channels and towards shorter steps for narrower channels. For the condyle joint, a channel width of 3 to 4 mm or less can usually be assumed.

Advantageously, image gradients relate to differences in color value intensities, in particular gray value intensities, Hounsfield scale values or radio frequency signal strength values.

Distinguishing different tissues such as bone, muscle, skin, cutis or fat requires telling apart distinct properties reflecting the information contained in the image data. This information is coded in distinct features of the single pixels or voxels like color/gray value intensities, e.g. for different Hounsfield scale values or radio frequency signal strength values. The features depend in some cases, on the imaging technology used to obtain the image data.

In a preferred method, the at least two objects are part of a joint, in particular a temporomandibular joint, particularly a mandible, in particular a mandibular condyle head, and a skull, in particular a skull base fossa. However, surface objects of other joints, such as hip joints, shoulder joints, vertebral joints, knee joints, wrist joints, etc. may additionally or alternatively be target of the segregation method as described above.

The condyle head and the fossa of temporomandibular joints tend to be fused together in images reconstructed from image data of temporomandibular joints. The segmentation of these structures is, as described above, very difficult and time-consuming. A computer implemented method as described above and in the following provides reliable and fast segmentation results.

The image data used in another preferred further development of the present invention comprises image data from Computed Tomography (CT), Cone Beam Computed Tomography (CBCT), Ultrasonic Imaging (US) or Magnetic Resonance Imaging (MRI).

However, the image data may alternatively or additionally be obtained from other imaging technology.

In a further preferred method, the image data refer to a three-dimensional (3D) image. Yet, the method according to the present invention can be applied to two-dimensional (2D) and one-dimensional (1D) images as well in order to identify a channel between at least two objects which channel may be represented in 2D as an area or, in 1D, as a section of a line delimited by one or two areas or sections of the line which represent surface objects in reality.

For example, the above mentioned imaging techniques can provide 3D images containing more information about and imparting a better overview of the examined region than 2D or 1D images. This enhanced information and overview is valuable, but requires the different structures to be correctly segregated. This segregation can be accomplished with the method and its preferred further features as described above.

According to an advantageous method, analyzing of the one or more image gradients comprises projecting the image gradients onto unit vectors, wherein the unit vectors are preferably defined in cardinal, ordinal and/or three-dimensional diagonal directions. The projecting of the image gradients onto unit vectors facilitates a comparison of the gradients with respect to opposing directions. The examined cardinal directions are the principal directions of a coordinate system, for example North, East, South, West, up and down. The ordinal directions are secondary directions at a 45-degree angle to two cardinal directions. The three-dimensional diagonal directions are directions at a 45-degree angle to three cardinal directions. Yet, the method according to the present invention is not restricted to gradients projected to unit vectors in cardinal, ordinal and/or three-dimensional diagonal directions, but the gradients can be projected to different directions or can be directly compared to each other.

In a preferred method, choosing the portion of the image data to start the algorithmic calculation from, comprises using a correlation technique. Nevertheless, other methods of choosing a portion of the image data can be used, such as simple manual delineation of the volume of interest.

The usage of known correlation techniques as described above provides a fast and reliable selection of the region of interest (ROI) that minimizes user interaction, costs for as well as risk of the selection of the region. In connection with the present invention, it allows for even more automated identification of the channel between at least two objects. In particular, it is not sensitive to initialization or the starting point, which is the case for many prior art approaches to identify an object's surface.

In further preferred method, the image data are provided in a data format conform to a Digital Imaging and Communications in Medicine (DICOM) standard, although the method according to the present invention can be used on the basis of image data of a different form.

BRIEF DESCRIPTION OF THE DRAWINGS

FIG. 1A' is a line drawing of FIG. 1A.

FIG. 1C' is a line drawing of FIG. 1C.

FIGS. 2A, 2B, 2C and 2D schematically illustrate the workings of the algorithm for finding the channel and segmenting the objects on both sides of the channel.

FIG. 3A' is a line drawing of FIG. 3A and FIG. 3C' is a line drawing of FIG. 3C.

DETAILED DESCRIPTION

Figure 1A:
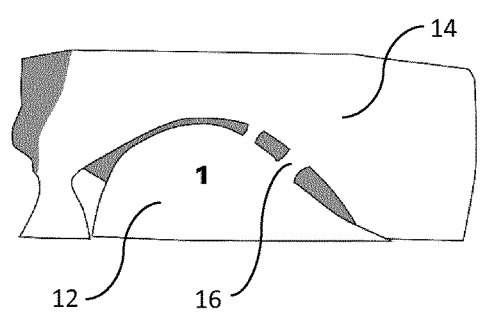
FIG. 1A shows an image of a temporomandibular joint reconstructed from CBCT image data. The surfaces of the condyle head and the fossa are fused in the image due to the surface reconstruction from the image data.
Figure 1A:
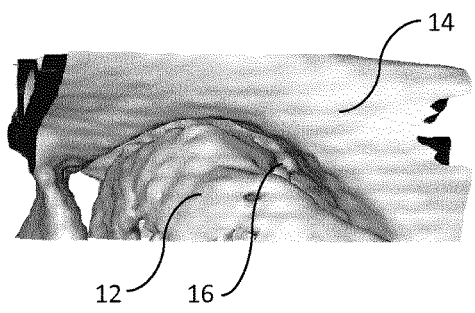

FIGS. 1A and 1A' show a close-up image of a temporomandibular joint reconstructed from CBCT image data. The condyle head 12 and the fossa 14 are fused in the image due to erroneous reconstruction from the image data. The reconstruction can, for example, result from a known mesh generation algorithm such as marching cubes or similar methods. For the common reconstruction methods, the user chooses a gray value threshold, the so-called isovalue threshold, that marks the visible surface. In case of FIGS. 1A and 1A', it can be seen that some of the voxels between the condyle head 12 and the fossa 14, i.e. in the channel defined by the temporomandibular joint, indicate a connecting surface 16. Hence, we only have one object (marked by the number 1 in FIG. 1A'). This can be due to several reasons. In general, the gray value of these voxels is larger than the isovalue threshold, so that a surface 16 is assumed and the condyle head 12 and fossa 14 are erroneously merged.

In order for the surgeon to be able to virtually move the mandible relative to the skull, it is required that the mandible and the skull are identified as separate objects. Hence, a method of identifying a channel 18 between the mandible and the skull, in particular between the condyle head 12 and fossa 14, would be advantageous for allowing a surgeon to prepare a surgical procedure.

Figure 1B:
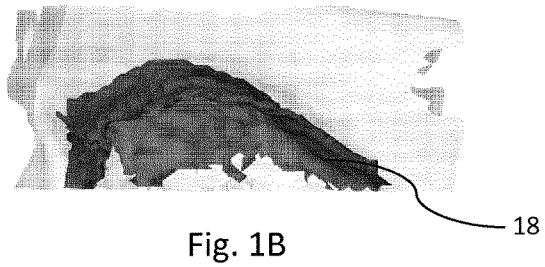
FIG. 1B illustrates a channel between the condyle head and the fossa in the image of FIG. 1A identified by a preferred method of identifying the channel.

FIG. 1B illustrates the channel 18 between the condyle head 12 and the fossa 14. The method of identifying the channel results in a location of channel voxels so that the separation of the condyle head 12 and the fossa 14 is easily possible.

The method can be carried out by using a computer program product, executed on a computer. The method can generally also be applied to other images, such as two-dimensional representations of joints or other channels or surface objects.

Preferably, the CT or CBCT image data, which usually contain a certain amount of noise, can be pre-processed, for example by the following pre-processing steps:

Firstly, the 3D image is mildly smoothed using e.g. a generally known Gaussian filter. Secondly, the gradients may preferably be selected based on vector size. In particular, gradients that are smaller than a particular threshold size are attributed to noise and are removed. This threshold size can be determined dynamically as the mean, median (or a combination thereof) of the gradient vector sizes present in the voxels in the region of interest (ROI).

However, the inventive method can also be carried out on the basis of non-pre-processed image data.

As part of the preferred method, one selects an image section containing the temporomandibular joint (FIGS. 1A and 1A') which, in the present case, is the ROI. Such a ROI is also schematically depicted in FIG. 2A. Here, we again have two objects 22 and 24 (or two parts of one object) with a channel between them. Both objects are connected by an artifact 26 which appears to cross the channel, thereby apparently connecting the two objects.

In this image section, image gradients are calculated for each voxel. The largest gradients occur at the edges as illustrated by the arrows in FIG. 2B. Afterwards, gradients of nearby voxels are compared along 13 cardinal, ordinal and 3D-diagonal directions. The neighboring voxels may be at different distances from the voxel that is under investigation. In case of 2D image processing, 4 cardinal and ordinal directions could be used in order to compare the directions of the gradients with regard to a pixel and its neighboring pixels.

For each voxel or pixel position p, a function value F(p) can be calculated from the opposing gradients in different directions and with different step sizes dp. Preferably, only opposing gradient vectors (indicating the existence of channel walls) are taken into account. All other gradient contributions are neglected.

Different channel widths W, i.e. where different channels which differ from each other in their general width or which vary, along their extension, in their widths, can preferably be addressed by a multi-resolution approach to calculate F(p) by calculating the maximal F(p) value over varying step sizes dp. The resolution is changed, according to the multi-resolution approach, in that the step sizes dp are changed.

After the calculation of the maximum of the function values F(p) for all pixels/voxels in the image section, the voxels or pixels with a non-zero value F(p) define the channel 28, (or 18) between the two objects 22 and 24, or specifically for FIG. 1, the condyle head 12 and the fossa 14.

Preferably, a post-processing procedure can be applied in order to further improve the quality of the found channel in the CT or CBCT image data. This post-processing is particularly advantageous in view of the problem that particularly condylar joint bone can be very cancellous, i.e. showing great variation in density. The latter leads to gradients inside the bone volume which may then be identified as (apparent) channel voxels. In order to remove such spurious channel voxels from the image data of the bone, the following post-processing steps may optionally be applied:

Firstly, apparent channel voxels with a non-zero gradient value are removed because true channel voxels would not hold a gradient value other than zero. It is understood that the "noise-free" pre-processed gradient values should be used.

Secondly, the size of the function values F(p) can be used to further refine the channel selection. By definition, the largest function values occur in the middle of the true channel as they are calculated from the largest gradient values marking the channel edges (cf. FIG. 2B). Only the channel voxels with function values above a certain threshold are preferably maintained. This threshold can be the mean, median (or a combination thereof) function value calculated over the function values.

Thirdly, a size of an interconnected channel volume is determined and only those apparent channel voxels that are connected to the largest volume of interconnected channel voxels, or a predetermined number of volumes, are preferably maintained as channel voxels. Here the number of largest volumes of interconnected channel voxels to be considered reflects the number of expected channels in the image.

All threshold parameters can be tuned to maximize the likelihood of segmentation and to have the least amount of loss of the surface object such as tissue, in particular bone.

However, also each step of the above described post-processing is only optional for the invention.

As mentioned before, CT or CBCT images may exhibit so-called streak artifacts in the channel. These artifacts are pixels or voxels that indicate the presence of a surface object 16, 26, for example tissue, in particular bone, although there is no such bony object at the imaged position in reality. With respect to the calculated channel volume 28, these streaks create holes in the volume (see FIG. 2B), making the surfaces 22 and 24 on each side to be erroneously connected.

Figure 4:
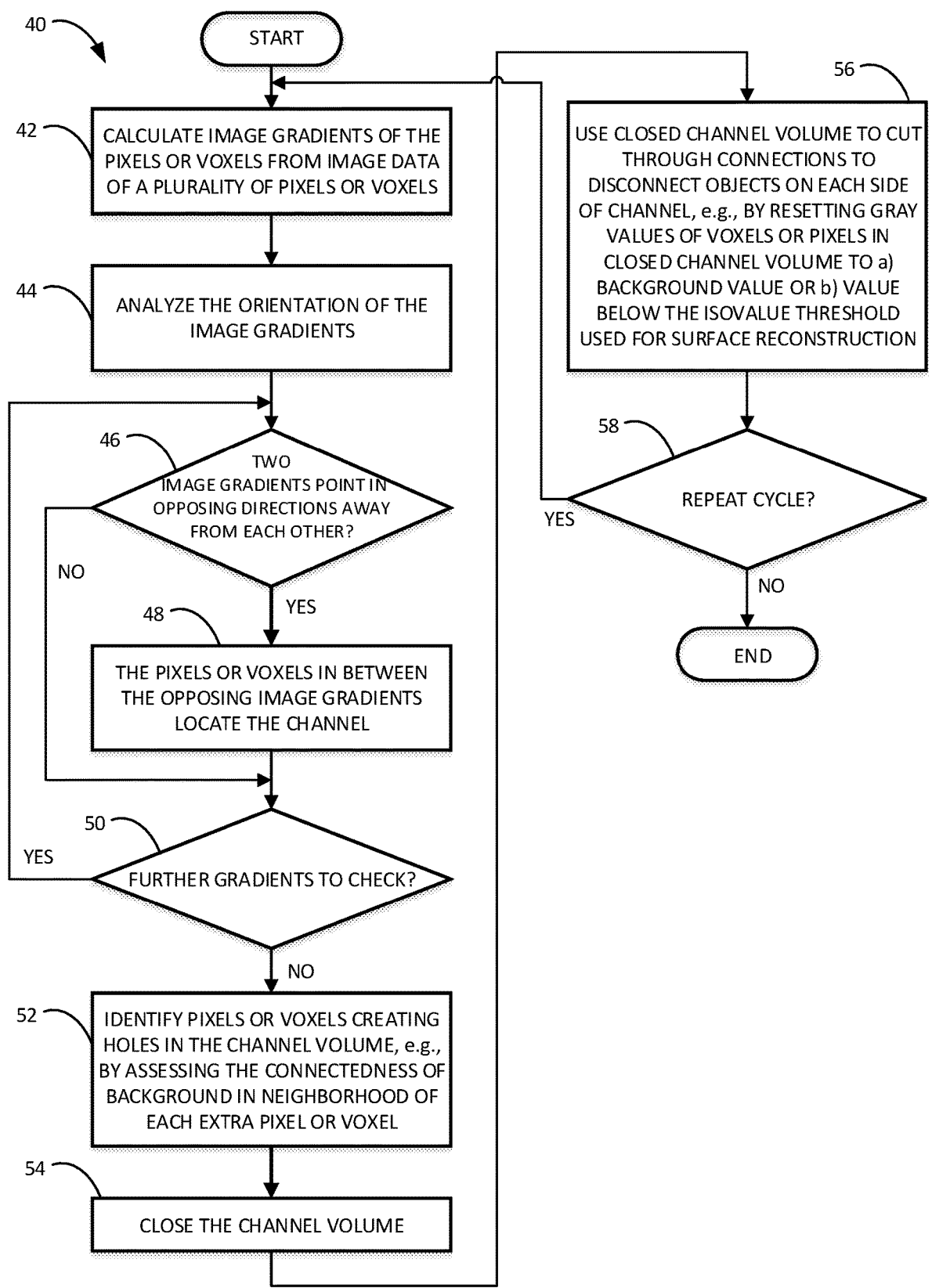
FIG. 4 is a flowchart of an example set of steps of the algorithm identified with FIGS. 2A, 2B, 2C and 2D.

In order to identify and remove such artifacts, the hole closing algorithm of Aktouf et al. as described in "Z. Aktouf, G. Bertrand, and L. Perroton: A 3D-hole closing algorithm; in Discrete Geometry for Computer Imagery, pages 36-47, 1996" and as described in "Z. Aktouf, G. Bertrand, and L. Perroton: A three-dimensional hole closing algorithm; in Pattern Recognition Letters, 23:523-531, 2002" is preferably applied. Starting from a hull of the identified channel volume, redundant voxels are removed (carved out) until a closed channel volume remains. This is done by assessing 52 in FIG. 4 the connectedness of the background in the cubic neighborhood of each extra voxel and is, as such, a method known in the art. Effectively, the holes in the channel volume 28 are closed as illustrated by the black squares in FIG. 2C.

Finally, the closed channel volume 28 (see FIG. 2C) can be used to cut through the streak artifacts 26 and disconnect the objects 22 and 24 on each side. In CT or CBCT data, this can for example be done by resetting 56 in FIG. 4 the gray values of the voxels or pixels in the closed channel volume to a) the background value or b) a value below the isovalue threshold used for surface reconstruction.

Figure 1C:
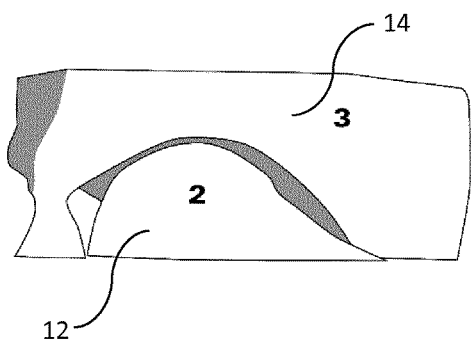
FIG. 1C shows an image of a temporomandibular joint reconstructed from CBCT image data. The condyle head and the fossa are not fused in the image due to additional segregation of the two bony structures with the preferred method to locate the channel.
Figure 1C:
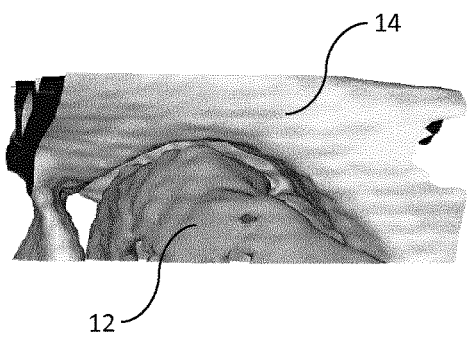

FIGS. 1C and 1C' illustrate an image of a temporomandibular joint reconstructed from CBCT image data, wherein the two bony structures were segregated by means of the preferred method described above. As a result, the condyle head 12 and the fossa 14 are not fused in the image. In particular, the surface 16 of FIG. 1A has been removed so that the mandible and skull are clearly separated. As a result, we now have two separate objects (as indicated by the numbers 2 and 3 inside the object drawings of FIG. 1C'). FIG. 1B shows the voxels that have been recognized as the channel 18 (with closed holes).

Figure 3A:
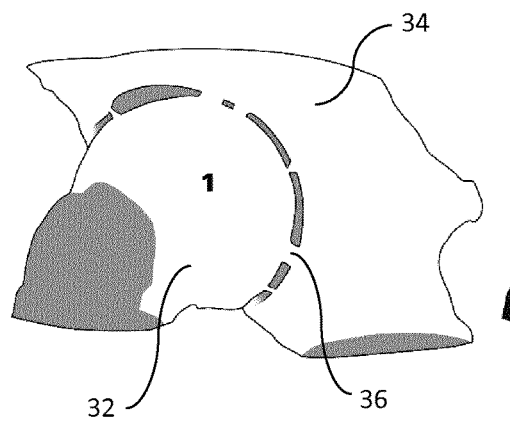
FIGS. 3A, 3B and 3C show an image of a hip joint reconstructed from medical CT image data. The setup is the same as in FIG. 1A to 1C.
Figure 3A:
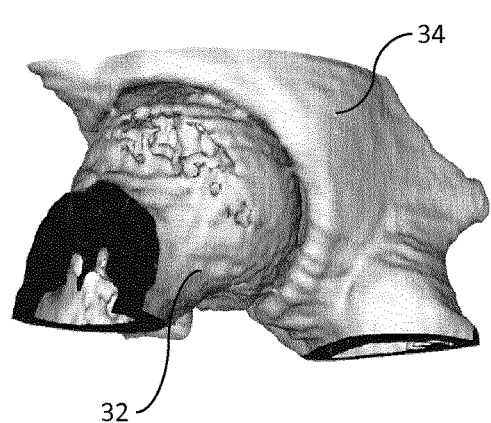

FIGS. 3A and 3A' show an image of a hip joint reconstructed from medical CT image data. More specifically, the femoral head 32 and acetabular fossa 34 are depicted. The surfaces of the femoral head and the fossa are fused in the image due to the surface reconstruction from the image data. Hence, we only have one object (marked by the number 1 in FIG. 3A'). The connections 36 are typically reconstruction or streak artifacts.

Figure 3B:

FIG. 3B depicts the channel 38 (defined by the hip joint) between the femoral head 32 and fossa 34 in the image of FIG. 3A, as identified by our proposed method of locating the channel. Note that all holes in the channel volume were closed.

Figure 3C:
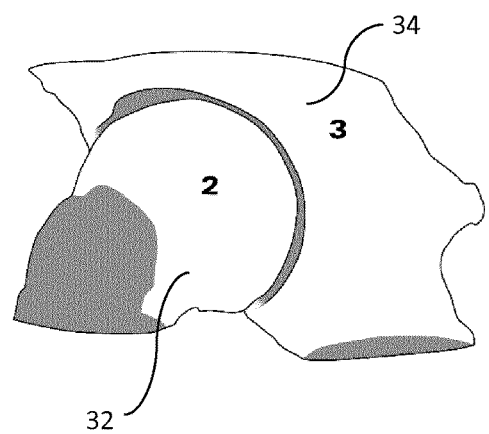
Figure 3C:
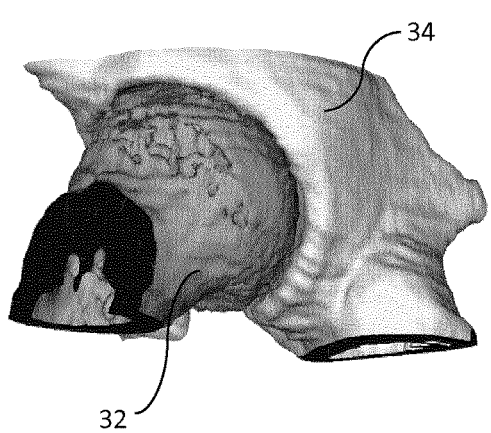

FIGS. 3C and 3C' show an image of the same hip joint reconstructed from the processed medical CT image data. The femoral head 32 and the fossa 34 are no longer fused in the image due to the additional segmentation of the two bony structures with the preferred method to locate the channel. As a result, we now have two separate objects (as indicated by the numbers 2 and 3 inside the object drawings of FIG. 3C').

The invention claimed is:
1. A computer implemented method of identifying, from image data comprising a plurality of pixels or voxels, a channel being an image region between at least two objects, or between parts of an object, wherein said objects or parts of an object comprise connections crossing said channel that are cut to disconnect said objects or parts of an object, the method comprising a cycle comprising:

calculating image gradients of the pixels or voxels of the image data, wherein the image gradients relate to differences in color value intensities, in particular gray value intensities, Hounsfield scale values or radio frequency signal strength values, and analyzing the orientation of the image gradients, wherein, if at least two of the image gradients point into opposing directions away from each other, the pixels or voxels in between the opposing image gradients directed away from each other locate the channel, the method further comprising:

identifying the pixels or voxels creating holes in the channel region, said pixels or voxels making said objects or said parts of an object on each side of the channel to be connected as the connections, closing the channel region by closing the identified pixels or voxels, using the closed channel region to cut through the connections thereby disconnecting said objects, or said parts of an object, on either side of the channel and obtaining separate objects or separate parts of an object.

2. The method of claim 1, wherein the objects are objects of tissue, comprising objects of bone, of the human or animal body.

3. The method of claim 1, wherein a portion of the image data is chosen such that it contains image data of at least a part of the at least two objects.

4. The method of claim 3, wherein the choosing of the portion of the image data comprises using a correlation technique.

5. The method of claim 1, further comprising generating surfaces of the corresponding objects that are separated by the channel.

6. The method of claim 1, wherein the at least two objects are parts of a joint, a temporomandibular joint, a mandible, or a mandibular condyle head, and a skull or a skull base fossa.

7. The method of claim 1, wherein the image data comprise image data from X-ray, computed tomography, cone beam computed tomography, ultrasonic or magnetic resonance imaging.

8. The method of claim 1, wherein the image data refer to a three-dimensional image.

9. The method of claim 1, wherein analyzing the orientation of the image gradients comprises projecting the image gradients onto unit vectors, wherein the unit vectors are preferably defined in cardinal, ordinal and/or three-dimensional diagonal directions with respect to the particular pixel or voxel being analyzed.

10. The method of claim 1, wherein the image data are provided in a data format conforming to a Digital Imaging and Communications in Medicine standard.

11. A non-transitory computer program product configured to execute the method of claim 1.

12. A non-transitory computer readable medium carrying the computer program product of claim 11.

13. An apparatus adapted to execute the computer program product of claim 11.

14. A medical system configured to carry out the method of claim 1.

15. A medical system, comprising a computer adapted to execute a non-transitory computer program product configured to perform the method of claim 1 and an imaging device for obtaining image data of at least two surface objects of bone.

16. The method of claim 1, wherein using the closed channel region to cut through the connections comprises resetting gray values of the voxels or pixels in the closed channel region to a) a background value or b) a value below an isovalue threshold used for surface reconstruction.

* * * * *